Sept. 16, 1969  E. M. GAUL ET AL  3,466,857
COTTON PICKER CONSTRUCTION
Filed Oct. 22, 1965  2 Sheets-Sheet 1
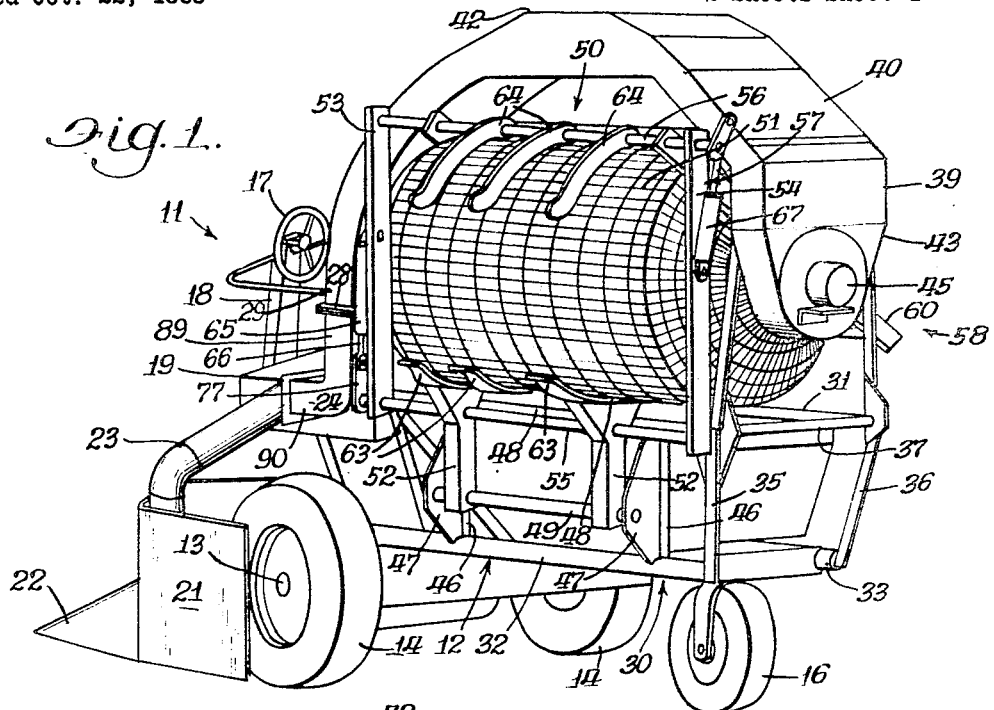
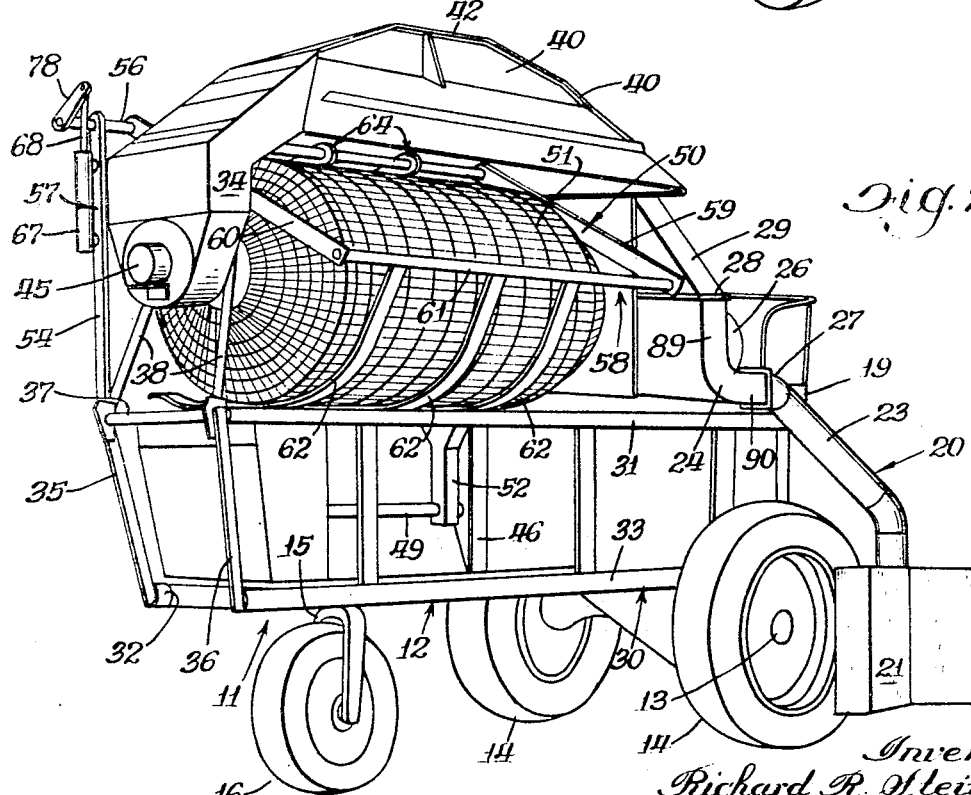
Inventors:
Richard R. Sieingas
Edward M. Gaul
By John J. Kowalik Atty.

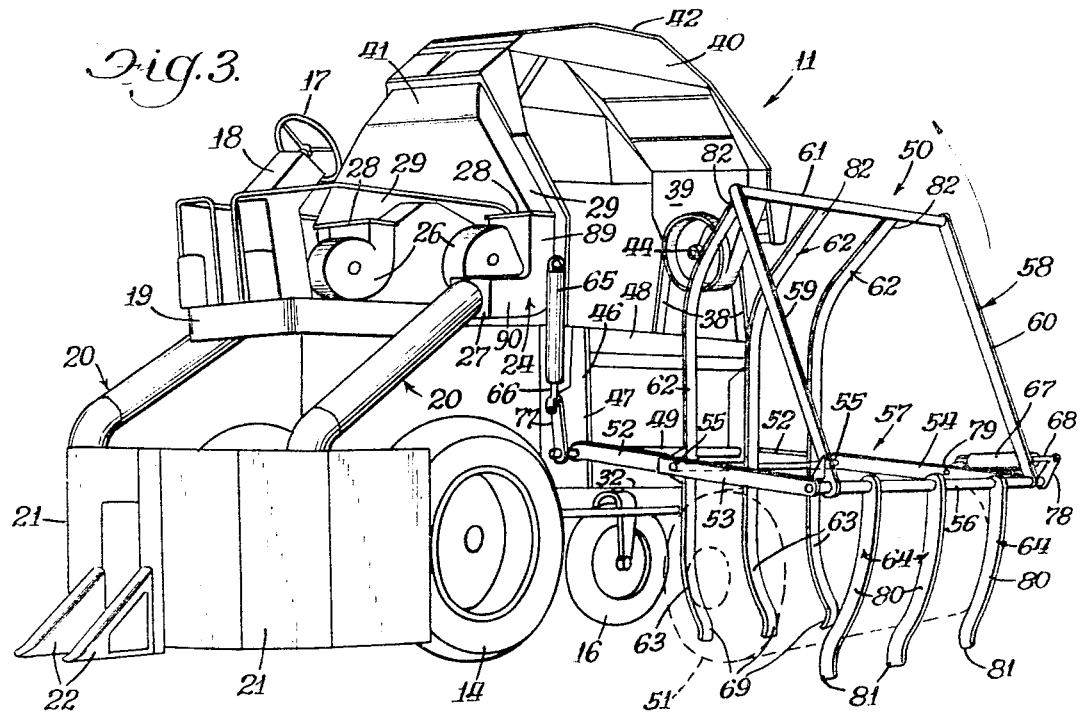
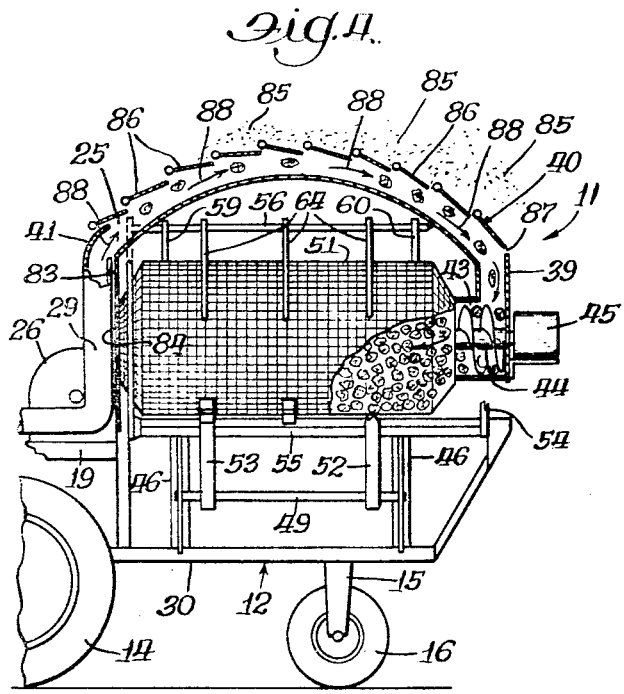
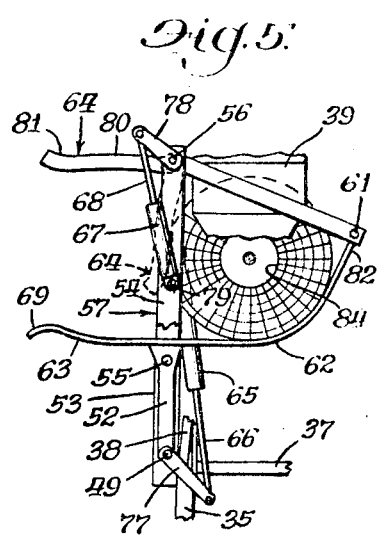

United States Patent Office 3,466,857
Patented Sept. 16, 1969

3,466,857
COTTON PICKER CONSTRUCTION
Edward M. Gaul and Richard R. Steingas, Naperville, Ill.,
assignors to International Harvester Company, Chicago,
Ill., a corporation of New Jersey
Filed Oct. 22, 1965, Ser. No. 501,065
Int. Cl. A01d 45/20
U.S. Cl. 56—30                                16 Claims

ABSTRACT OF THE DISCLOSURE

A cotton harvester with a cotton container removably mounted on the harvester frame and a gripper on the frame releasably embracing the container for removing a filled container and replacing an empty container.

---

The instant invention relates to cotton harvesting. Particularly the invention relates to a cotton picker and a replaceable basket therefor.

A conventional commercial cotton picker comprises a self-propelled body having mounted on opposite sides thereof a pair of row units adapted simultaneously to harvest cotton from a pair of adjacent rows. Each row unit comprises a picker drum toward which cotton plants from a row being harvested are fed for aggresive separation of the cotton from such plants. A conveyor pipe serves to translocate cotton, drawn in said pipe by a conveyor fan, from an associated picker drum to a distributor duct through which harvested cotton is blown by said conveyor fan into a common collection receptacle or basket. A conventional collection basket is mounted on the framework of its picker, being pivoted thereto to facilitate dumping of the contents at a receiving station. Such dumped cotton requires re-collection in another container to facilitate subsequent handling and translocation. The requirement to dump cotton from a collection basket for transfer to another container for translocation or handling is inefficient in the light of the present disclosure, a description of objects of which will ensue presently.

There is known prior means adapted to obviate transfer of harvested cotton from a cotton picker basket to another container. Such prior means define a basket which is removably mounted on the framework of its picker. But such prior means include a complicated mechanism for releasably securing the basket to its picker. The attendant difficulty of management of such prior device, including the demand of time for removal and replacement of a basket and consequent effect of increasing expense over that required to operate conventional devices, has in large part deterred employment of such prior means. With improved means to facilitate removably securing a basket to a cotton picker, economy in cotton harvesting could be effectuated.

To further minimize expense attendant handling of cotton upon harvesting, the relative capacity of a basket could be increased. Inasmuch as there are practical limitations to increasing basket size, the solution resides in providing means for increasing the amount of cotton that can be held by a basket. The inherent physical character of cotton permits a solution in that direction because cotton is compactible. Accordingly, a cotton picker having a basket and means for compacting cotton therein provides the solution.

It is a principal object of the instant invention to provide an improved cotton picker.

It is an additional object of the instant invention to provide in a cotton picker an improved harvested-cotton receptacle.

It is another object of the instant invention to provide in a cotton picker having a removably mounted harvested-cotton receptacle improved means for removably mounting such cotton receptacle.

It is a further object of the instant invention to provide in a cotton picker improved means for compacting cotton within the harvested-cotton receptacle.

It is yet another object of the present invention to provide a harvested-cotton receptacle adapted to be removably mounted on the framework of a cotton picker and having means for feeding harvested cotton into the receptacle opening, said feeding means serving as a compactor.

Still another object of the present invention is the provision of a cotton picker having means for aggressively removing cotton from cotton plants and feeding such removed cotton to a harvested-cotton receptacle in which the harvested cotton is compacted by the aggressive feeding parts.

It is, moreover, an object of the present invention to provide for a cotton picker a removably mounted harvested-cotton receptacle having an opening into which the cotton can be aggresively fed and compacted within the receptacle, the opening being automatically alignable with the cotton feeding means upon replacement of the receptacle.

Still a further object of the instant invention is the provision in a cotton picker and the like of a removably mounted harvested-cotton receptacle, and a rockable expandable framework by which said receptacle is held upon the cotton picker from which said receptacle is carried and released upon rocking and opening of said framework.

The foregoing and other objects, features and advantges of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a left rear perspective view of a cotton picker embodying the present invention.

FIG. 2 is a right rear perspective view of the cotton picker shown in FIG. 1.

FIG 3 is a left front perspective view of the cotton picker showing the releasable basket-holding structure disposed for basket release.

FIG. 4 is a left side elevational view of a part of said cotton picker, parts broken away for the purpose of illustration.

FIG. 5 is a rear elevational view of said invention.

Referring now more particularly to the drawings, there is seen a mobile cotton harvesting device or cotton picker generally designated by the numeral 11. The cotton picker 11 comprises a frame 12 arranged for harvesting in a generally fore-aft relationship. Frame 12 supports a forward axle 13 on the opposite end portions of which a pair of front traction wheels 14 are mounted. The frame also supports the mounting 15 for a rear steerable wheel 16 which is adapted to be controlled by a manually operable steering wheel 17. The steering wheel 17 may be mounted on a steering post 18 carried on an operator's platform 19 supported by the frame 12 at the normally lead or forward end of the cotton picker 11 above the traction wheels 14.

The cotton picker 11 is shown as a two-row harvester, being adapted to harvest simultaneously from a pair of conventionally spaced-apart rows of cotton plants as the picker advances in a harvesting path in a cotton field. To that end, the picker 11 mounts a pair of elongated row units generally designated 20 which may be supported on the front end portion and disposed along opposite sides of said frame.

As illustrated in FIGS. 1, 2 and 3, each of the row units 20 comprises a picker drum 21 supported adjacent the ground, the picker drums 21 being spaced from each other a distance such that adjoining rows of cotton plants can be simultaneously harvested, one by each of said picker drums. Conventional plant lifter means 22 are disposed in operable relationship about a throat or entryway (not seen) through which the cotton plants enter into the drums 21.

Each drum 21 may comprise a conventional mechanism in which cotton is aggressively separated from its vegetation and from which mechanism cotton is drawn through a conveyor tube 32 by a blower fan (unseen), the housing 26 of which normally communicates or is intergral with the housing of a duct transition section 24. Each transition section 24 is substantially L-shaped in vertical section, comprising a horizontal part 90 and a vertical part 89 and has a pair of opposite mounting flanges 27 and 28. The lower mounting flange 27 provides the means for connecting the lower end portion of the transition section 24 to the upper end portion of the conveyor duct 23. The upper mounting flange 28 provides the means by which a corresponding transition section 24 is connected to an upwardly extending duct 29 into which cotton drawn from an associated conveyor 23 is blown by a corresponding row unit blower fan.

As illustrated in FIGS. 1, 2 and 4, the frame 12 of the instant embodiment comprises a lower frame member 30 and an upper frame member 31 which is disposed in a plane substantially parallel to the lower frame member 30. The lower frame member 30 is characterized by a pair of left and right side rails 32 and 33 which extend in a generally fore-to-aft and forwardly diverging relationship and which are disposed on opposite sides of the frame 12. Extending vertically upwardly from the aft end portions of the rails 32 and 33 are a pair of frame braces 35 and 36 which respectively define the left and right rear corners of the frame 12 and which, at their upper end portions, are rigidly secured to the transversely extending rail 37 of the frame member 31, as illustrated in FIG. 2.

As illustrated in FIG. 2, a pair of struts or braces 38 have their lower end portions secured to the frame member 31, from the aft right and left corners of which said struts or braces are projected upwardly into supporting engagement with a sheet metal hopper 39. The hopper 39 is disposed substantially midway between the sides of the picker and comprises a communicatively connected extension of a cotton cleaner housing designated 40.

The cotton cleaner housing 40 is a generally arcuate duct structure which may be mounted symmetrically with a vertical plane in which the longitudinal axis of the cotton picker 11 is disposed. In the instant embodiment, the cleaner housing 40 defines the top of the cotton picker 11 and has a passageway into the forward end 25 of which cotton 34 is blown from a common duct 41 formed by merger of the upper end portions of the ducts 29 toward the hopper 39 in the direction indicated by arrows 88, in FIG. 4.

The cleaner housing 40 may be of conventional construction, the details of which are not intended as limiting in the present invention. However, the same may have an upper opening or openings 87 in the top wall 42 in which there are mounted a plurality of adjustable grates 86, only some of which are numbered in FIG. 4 and through which debris 85 is blown outwardly from the cotton picker 11 under the blower force of the row unit fans.

A screw conveyor or auger housing 43 is connected in receiving association with the lower end portion of the hopper 39. Said housing 43 operably supports therein a mechanical compactor in the form of an auger or screw conveyor 44 which is disposed in receiving alignment with the delivery or lower end of the hopper 39 out of which cotton is fed by gravity. The auger 44 has a horizontal axis of rotation which is disposed in the plane which may define the midline of the cotton picker 11. Suitable means, which in the instant embodiment comprises a hydraulic motor 45, the housing of which is supported adjacent the auger housing 43, is connected to a hydraulic fluid source (not shown). Motor 45 may be controlled by the operator of the platform 19 and is operably connected to and in driving relationship with the auger 44.

As illustrated in FIG. 1, a pair of vertical frame ribs 46 have their lower end portions rigidly secured to the frame member 30 in spaced-apart relationship longitudinally of the longitudinal axis of the picker 11 and have their upper end portions rigidly secured to a frame rail 48 which, as seen in FIG. 3, is parallel and superposed with respect to the side rail 32. Frame rail 48 is a component of the frame member 31. Each rib 46 has a laterally extending vane or mounting plate 47 which is projected to the left from the framework 12 and provides the means for anchoring one end portion of a shaft 49. The foregoing results in disposition of shaft 49 parallel to, medially and to the left of the frame rail 48. The shaft 49 rockably supports a releasable basket-holding and transferring structure generally designated as 50 which is adapted to releasably support a cotton-holding basket, bale, tube or receptacle 51 which may be of wire mesh construction and adapted to receive cotton delivered by the auger 44, in a manner hereinafter to become apparent.

Now, having reference to the basket 51, when the same is disposed in cotton-receiving position, it may be circular in vertical section. In horizontal section, however, it may be ovate, being elongated in normally fore-to-aft direction. The opposite normally fore-and-aft ends are tapered toward a center about which there are opposite end openings 84, one of which is seen in FIG. 4, and which are designed for disposition in concentric alignment with the axis of rotation of the auger. The foregoing construction provides a substantially symmetrical basket or receptacle 51 which may be loaded by the auger 44 from either end. It is appreciated by referring to FIGS. 1 and 4 that the length of the basket is substantially equivalent to the distance between the inner surfaces of the auger housing 43 and a plate 83 mounted behind the common duct 41. Therefore, cotton fed by the auger 44 into the rear opening 84 of receptacle 51 and tending to come out of the opposite or front end opening will be retained by the plate 83 which blocks the front basket opening 84.

The basket-holding structure 50 comprises a pair of rocker arms or stems 52 which are disposed vertically when the structure 50 is supporting the basket 51 in cotton-receiving position. One end portion of each of the arms 52 is journalled on the shaft 49, said arms 52 being spaced apart longitudinally of said shaft a distance calculated to provide adequate or efficient support for the basket 51 when it is being held in the basket-holding structure 50. As illustrated in FIGS. 1 and 3, the opposite ends of the arms 52 support a rectangular frame generally designated 57 and having front and rear frame rails 53 and 54, respectively, and rockably connected thereto parallel transverse rails 55 and 56, the rail 55 being journalled in spaced-apart positions in arms 52 at the end portions thereof distal from the shaft 49. The length and width of the frame 57 are such that the basket 51 may pass therethrough for a purpose which will become apparent hereinafter.

As illustrated in FIGS. 1, 2 and 3, the rail 56 is common to the frame 57, and also to another rectangular frame generally designated 58. Frame 58 is disposed at an angle of approximately 70° to the frame 57. In addition to the rail 56, the frame 58 comprises front and rear rails 59 and 60 and an integral transverse rail 61 which is parallel to the common rail 56. The angular disposition of the frames 57 and 58 is such that when they are in cotton-receiving position, the rail 61 is at a horizontal level sufficient to permit it to serve as a retainer for the basket 51 holding the same against lateral displacement or falling from the right side of the cotton picker, as clearly seen in FIGS. 2 and 4.

Extending outwardly from the opposite sides of the rail 55 are a plurality of ribs or arms, the ribs which extend to the right when the frame 57 supports the basket 51 in cotton-receiving position being identified by the numeral 62, and those extending to the left being identified by the numeral 63. By reason of the construction heretofore defined when the structure 50 supports basket 51 in cotton-receiving position, the ribs 63 extend to the left of the picker frame 12, while the ribs 62 provide what may be considered a floor, rolling support or basket seat extending acrosse the frame member 31. The ribs 62 and 63 may be further characterized in that the arms are arranged in parallel pairs spaced longitudinally of the rail 55; and, in the embodiment shown, each rib 63 is disposed in alignment with a corresponding rib 62 transversely of said rail 55, as illustrated in FIGS. 3 and 4. Furthermore, as illustrated in FIG. 3 and 4, the ribs 63 have free outer end portions 69 which may be spring curved, while the outer ends or portions 82 of the ribs 62 are curved toward and rigidly connected to the transverse frame rail 61 to provide a pocket in which basket 51 is held during harvesting.

A plurality of arms or ribs 64 have their inner end portions secured to the rail 56 in spaced-apart position longitudinally of said rail, the ribs 64 being mounted for rocking about the axis provided by the rail 56. The ribs 64 may have spring curved outer end portions 81 and medial offset arcuate portions 80 which have a radius of curvature equal to that of the basket 51. Thereby, said arms 64 are adapted to snugly grip basket 51. Additionally, ribs 63 and 64 may be disposed in opposed relationship in alignment in vertical planes, and the ribs 64 may be characterized as snugly engaging the left side of the basket 51 when the basket-holding structure 50 is holding the basket 51 in cotton-receiving position, as illustrated in FIG. 5.

The device operates by having the auger 44 feed harvested cotton into the aft end of a basket 51, the auger having been gravity fed from hopper 39 at a constant rate. The hopper 39 serves as a reservoir into which cotton is blown through the cleaner 42 from the ducts 29 under the action of the fans (not seen) comprising the cotton-harvesting row units 20. The cotton continues to be fed under the action of the auger 44 as the cotton picker advances in a field being harvested, until the basket is filled after which time the torque of the auger compacts the cotton in a forward direction, the plate 83 precluding spillage of the cotton through the front end basket opening 84. When the basket is sufficiently filled, the ribs 64 are rocked from the solid line position to the dotted line position of FIG. 5 by hydraulic means comprising a double-acting cylinder 67. (The dotted line position of ribs 64 is the same as that shown in FIG. 1.)

As illustrated in FIGS. 3 and 5, one end of cylinder 67 may be pivotally connected as at 79 to the rail 54. The reciprocative rod 68 of said cylinder 67 is pivotally connected to one end of a link 78, the opposite end of which is operatively connected to one end of the transverse rail 56 of the rectangular frame 57. Thereby, the ribs 64 are controlled.

Thereafter, the basket-holding structure 50 is rocked from the position illustrated in FIG. 1 to the position shown in FIG. 3 because of operation of double-acting hydraulic means comprising a hydraulic cylinder 65. As illustrated in FIGS. 3 and 5, cylinder 65 is suitably supported by frame 12. Its reciprocative rod 66 is operably connected to one end of a link 77, the opposite end of which is operably connected to the shaft 49 about which, upon operation of said cylinder 65, said frame 57 is caused to rock.

Upon rocking of the frame 57 from the position of FIG. 1 to the position of FIG. 3, the basket 51 is rolled off ribs 62 and caught and held between the ribs 63 and 64 as they are rotated into ground engagement.

It is appreciated that, while the ribs 63 and 64 are carrying basket 51 groundward, the distance between the adjacent ends of the ribs 63 and 64 is smaller than the diameter of the basket 51 so that the same will not fall. However, after the frame 57 has been rocked to engage the outer end portions 69 and 81 of the ribs 63 and 64 with the ground, the ribs 64 are rocked open farther about the rail 56 away from the ribs 63 under further arm-opening actuation of hydraulic cylinder 67. Thereby, the gap between the outer end portions of the ribs 63 and 64 is widened to a dimension greater than the diameter of the basket 51, whereupon rocking the frame 57 upwardly, the basket-holding structure 50 will be moved away from the basket 51 which is thereby released. That basket, with the cotton therein contained, may be then manually removed, and an empty basket positioned in its place.

Thereafter, the basket-holding structure 50 may again be rocked about shaft 49 to carry the ribs 63 and 64 into ground engagement about the new basket. The ribs 64 may then be actuated by the hydraulic means comprising rod 68 to partially close the ribs 64 into basket-holding position by narrowing the gap between the ribs 63 and 64, and the frame 57 returned to the position shown in FIG. 1 by actuation of hydraulic rod 66, whereby the new basket is lifted from the ground.

By then moving rod 68 to the position shown in FIG. 4, the new basket will be rolled from between the ribs 63 and 64 into its cotton-receiving seat in which it is gripped between ribs 62 and 64.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. In a cotton harvester having means providing a mobile supporting framework, cotton harvesting means mounted on said framework, a cotton container removably supported on said framework for temporary storage of picked cotton, cotton conveyor means in delivery relationship with said cotton container for translocating thereto cotton from said cotton harvesting means, cotton container holding and transferring means mounted on said frame and adapted to position an unfilled container on the frame and remove a filled container from said frame, and actuating means controlling the movement of said holding and transferring means to effect the aforesaid operations.

2. In a cotton harvester having means providing a mobile supporting framework, cotton picking means mounted on said framework for harvesting cotton, a cotton container on said framework, cotton conveying means for delivering cotton from said cotton picking means to said cotton container, a holding frame supported on the framework and having movable components for releasably holding said cotton container in cotton receiving position on said framework; means for rocking said holding frame on the harvester framework to translocate said cotton container to cotton receiving and dump positions, and means for actuating the movable components to grip and release said cotton container.

3. In a cotton picker having means providing a mobile supporting framework, cotton picking means mounted on said framework for harvesting cotton, a cotton container on said framework, cotton conveyor means mounted in cotton receiving association with said cotton picking means for delivery therefrom of cotton to said cotton container, the improvement comprising a holding structure rockably mounted on said framework for releasably holding said cotton container in cotton receiving position, said holding structure having a container holding section in which said cotton container is supported in cotton receiving position and a container dump section from which said cotton container is released from said framework for replacement; means for rocking said holding structure to translocate a cotton container to cotton receiving and dump positions, and means for translocating a cotton container to said container holding and said container dump sections from the other thereof, respectively.

4. The device defined in claim 1 in which the container holding and transferring means comprises a frame pivotally connected to said framework and adapted for vertical and horizontal disposition; a pair of cages carried by said frame in opposed positions and adapted to be rocked by said actuating means into vertical and horizontal alignment, a first of said cages when horizontally aligned with the other thereof supporting said cotton container for reception of cotton, the other of said cages when vertically aligned with the first thereof holding said cotton container for release from said holding and transferring means, the cotton container moving from one of said cages to another thereof upon corresponding operation of said actuating means.

5. The device defined in claim 2 in which the holding frame comprises a first frame part adapted for disposition on the framework to hold a cotton container in receiving alignment with said conveyor; a second frame part connected to the first frame part and extending laterally from said framework when said frame is in cotton receiving position, said second frame part being adapted to be rocked toward the ground and to receive and releasably hold from said first frame part a cotton container as said holding frame is rocked.

6. The device defined in claim 5 in which the movable components comprise releasable container gripping means, said container gripping means being movable toward said first frame part to push from the second frame part to the first frame part and thereagainst hold a cotton container in receiving alignment with said conveyor, said container gripping means being movable from container holding position into alignment with said second frame part to therewith catch a container as said holding frame is rocked to dump position and to releasably secure a container in said holding frame when said holding frame is disposed in dump position.

7. The device defined in claim 3 in which the means for translocating a cotton container comprises a fixed member and an opposed rockable member defining said container dump section, and control means for reversibly moving said rockable member: toward said holding section to transfer thereto a container from the dump section to the holding section, to catching position opposite said fixed member to hold a container as said holding structure is rocked to dump position and toward cotton receiving position, and away from said fixed member to release a container from the dump section and said holding structure.

8. In a cotton picker having means providing a mobile supporting framework, cotton picking means mounted on said framework for harvesting cotton, a cotton container on said framework, cotton conveyor means mounted in cotton receiving alignment with said cotton picking means and for delivery of cotton to said cotton container, and support means mounted on said framework and characterized by means providing an axis of rotation; a container support spaced from and rockable about said axis of rotation, said container support having a first part disposable over said framework and a laterally extending part; support motivating means for rocking said support to horizontal container supporting position and vertical container dump position; container moving means for shifting a container to the first part from the laterally extending part into cotton receiving alignment with said conveyor, shifting of a container from the first part to the laterally extending part being gravity actuated; release means for freeing a container from said container support and aggressive means for engaging and holding a replacement container against said container support.

9. The device defined in claim 8 in which the last-mentioned means is a rockable member mounted in opposition to said laterally extending part and adapted to swing to releasably trap a replacement container with said laterally extending part on said container support.

10. In a cotton picker device, the combination of means providing a harvester framework, cotton picking means mounted on said framework for aggressive procurance of cotton during harvesting, cotton conveyor means extending downstream from said cotton picking means for translocation of picked cotton from said cotton picking means to a cotton receptacle, a cotton receptacle on said framework, dump means for releasably holding said cotton receptacle on said framework, with means providing a replaceable cotton receptacle having a restricted cotton receiving port to preclude spillage of cotton upon dumping of said receptacle.

11. The device defined in claim 10 further characterized in that the cotton conveyor means includes an aggressive mechanism for forcing cotton through said port into said receptacle.

12. A cotton picker comprising a frame having front and rear end portions arranged for forward movement; cotton picking means mounted on the front end portion of said frame and adapted to aggressively pick cotton from plants during harvesting; a cotton feeding mechanism mounted on the rear end portion of said frame and including means for aggressively feeding and compacting cotton forwardly; a cotton receiving receptacle mounted on a medial portion of said frame and having an end opening in cotton receiving alignment with said cotton feeding means; elongated cotton translocating duct means disposed above said receptacle, said duct means having a forward end and an aft end connected in cotton receiving and cotton delivery association with said picking means and said feeding means, respectively, and pneumatic means for moving the cotton through said duct means.

13. In a cotton harvester comprising cotton harvesting means for gathering cotton and incidental trash, receptacle means, conveying means for delivering harvested cotton from said harvesting means to said receptacle means and including duct means with trash discharge means for removing the trash from the cotton during delivery thereof from the cotton harvesting means to the receptacle means, compacting means disposed in movement-augmenting relation to cotton moving through said duct means and including means for packing cotton under pressure into said receptacle means.

14. The invention according to claim 13 and said compacting means comprising an auger having flighting engageable with the cotton for forcibly packing the cotton into the receptacle means.

15. In a cotton harvester having a cotton harvesting component, support means mounting said componet, receptacle means carried by said support means, pneumatic cotton conveying means between said harvesting component and receptacle means for delivering harvested cotton from the former toward the latter, said conveying means including a duct having a discharge end adjacent the receptacle means, said receptacle means having an inlet opening, and mechanical cotton conveying means between said discharge end and said inlet opening and including means for trajecting forcibly into and compacting cotton in said receptacle means.

16. The invention according to claim 15 in which said mechanical conveying means comprises an auger disposed in endwise relation to the inlet of the receptacle means.

References Cited

UNITED STATES PATENTS 2,957,726  10/1960  Fergason _____ 56—11 X
3,215,291  11/1965  Nickla.

HUGH R. CHAMBLEE, Primary Examiner

U.S. Cl. X.R.

56—12; 214—518